United States Patent
Voit

(10) Patent No.: US 11,184,280 B2
(45) Date of Patent: Nov. 23, 2021

(54) METHODS AND APPARATUS FOR VERIFICATION OF NON-STEERED TRAFFIC FLOWS HAVING UNSPECIFIED PATHS BASED ON TRAVERSED NETWORK NODE OR SERVICE FUNCTION IDENTITIES

(71) Applicant: Cisco Technology, Inc., San Jose, CA (US)

(72) Inventor: Eric Voit, Bethesda, MD (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/158,066

(22) Filed: Oct. 11, 2018

(65) Prior Publication Data
US 2020/0120025 A1  Apr. 16, 2020

(51) Int. Cl.
| | |
|---|---|
| *H04L 12/741* | (2013.01) |
| *H04L 29/06* | (2006.01) |
| *H04W 12/08* | (2021.01) |
| *H04L 9/32* | (2006.01) |

(52) U.S. Cl.
CPC ........... *H04L 45/74* (2013.01); *H04L 9/3247* (2013.01); *H04L 63/10* (2013.01); *H04W 12/08* (2013.01); *H04L 63/02* (2013.01); *H04L 63/145* (2013.01); *H04L 63/1458* (2013.01)

(58) Field of Classification Search
CPC ....... H04L 45/74; H04L 9/3247; H04L 63/10; H04L 63/02; H04L 63/145; H04L 63/1458; H04W 12/08
See application file for complete search history.

(56) References Cited

U.S. PATENT DOCUMENTS

| | | | | |
|---|---|---|---|---|
| 9,674,764 B2 * | 6/2017 | Jain | .................. | H04W 36/00 |
| 9,781,055 B2 * | 10/2017 | Liu | .................. | H04L 47/783 |
| 10,116,553 B1 * | 10/2018 | Penno | .................. | H04L 45/306 |
| 10,367,735 B2 * | 7/2019 | Jeuk | .................. | H04L 41/5041 |

(Continued)

FOREIGN PATENT DOCUMENTS

| | | | | |
|---|---|---|---|---|
| EP | 3468117 A1 * | 4/2019 | ............ | H04L 45/306 |
| WO | WO-2018146526 A1 * | 8/2018 | ......... | H04L 12/1407 |

OTHER PUBLICATIONS

Brockners et al., "Requirements for In-situ OAM," IETF Network Working Group, Mar. 2017, pp. 1-24.

(Continued)

*Primary Examiner* — Deepa Belur
(74) *Attorney, Agent, or Firm* — Merchant & Gould P.C.

(57) ABSTRACT

In one illustrative example, a network node configured for packet flow verification may receive a packet from a host (e.g. a wireless mobile device operating in a wireless network) and obtain, from a header of the packet, data indicative of one or more traversed network node or service function identities. The identities may correspond to one or more traversed network nodes or service functions through which the packet has traversed in a non-steered communication having an unspecified path. Each received data indicative of a traversed network node or service function identity may be network node-added data, provided as part of in-situ Operations, Administration, and Maintenance (iOAM) data.

20 Claims, 10 Drawing Sheets

(56) References Cited

U.S. PATENT DOCUMENTS

| | | | |
|---|---|---|---|
| 2013/0322366 A1* | 12/2013 | Racz | H04L 47/2483 370/329 |
| 2014/0362682 A1* | 12/2014 | Guichard | H04L 41/5038 370/221 |
| 2015/0134619 A1* | 5/2015 | Factor | G06F 16/125 707/663 |
| 2016/0134531 A1* | 5/2016 | Assarpour | H04L 45/74 370/392 |
| 2016/0344803 A1* | 11/2016 | Batz | H04L 12/1403 |
| 2017/0201435 A1* | 7/2017 | Tan | H04L 47/31 |
| 2018/0041524 A1* | 2/2018 | Reddy | H04L 63/1408 |
| 2018/0176134 A1 | 6/2018 | Pignataro et al. | |
| 2018/0176927 A1* | 6/2018 | Deng | H04W 72/005 |
| 2018/0219762 A1* | 8/2018 | Wang | H04L 45/04 |
| 2018/0219771 A1* | 8/2018 | Onno | H04L 12/2898 |
| 2018/0227315 A1* | 8/2018 | Taneja | H04L 63/1408 |
| 2018/0241680 A1* | 8/2018 | Larose | H04L 41/5012 |
| 2018/0278548 A1 | 9/2018 | Pignataro et al. | |
| 2019/0140947 A1* | 5/2019 | Zhuang | H04L 45/306 |
| 2019/0268384 A1* | 8/2019 | Hu | H04L 63/20 |
| 2019/0372877 A1* | 12/2019 | Nainar | H04L 43/028 |

OTHER PUBLICATIONS

Brockners et al., "Proof of Transit," IETF Network Working Group, Jun. 2016, pp. 1-20.
Brockners et al., "Data Fields for In-situ OAM," IETF Network Working Group, Sep. 2017, pp. 1-29.
Alfoudi et al., "Traffic Management in LTF-WiFi Slicing Networks," Liverpool John Moores Univ., 2015, pp. 1-6.

\* cited by examiner

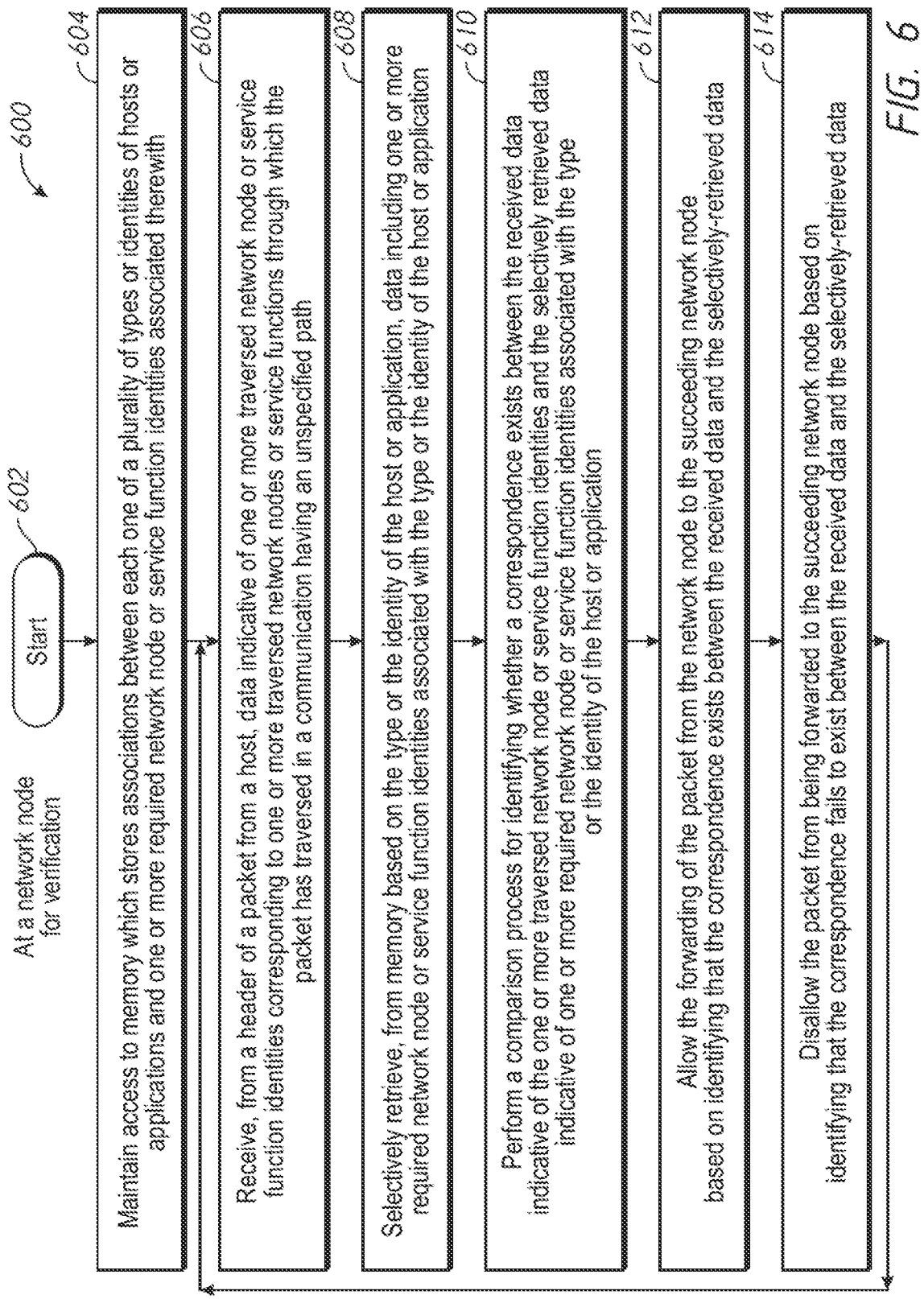

METHODS AND APPARATUS FOR VERIFICATION OF NON-STEERED TRAFFIC FLOWS HAVING UNSPECIFIED PATHS BASED ON TRAVERSED NETWORK NODE OR SERVICE FUNCTION IDENTITIES

TECHNICAL FIELD

The present disclosure relates generally to techniques for packet flow verification in communication networks, and more particularly to methods and apparatus for verification of non-steered traffic flows having unspecified paths based on traversed network node or service function identities included as in-situ Operations, Administration, and Maintenance (iOAM) data.

BACKGROUND

There is a need for packet flow verification methods and apparatus for ensuring compliance of many "ordinary" packet flows in communication networks, e.g. non-steered traffic flows having unspecified paths.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 6 is a flowchart for describing a more detailed method for use in packet flow verification for non-steered traffic flows having unspecified paths according to some implementations of the present disclosure, which may be for use in a network node configured for such packet flow verification.

Figure 1A:
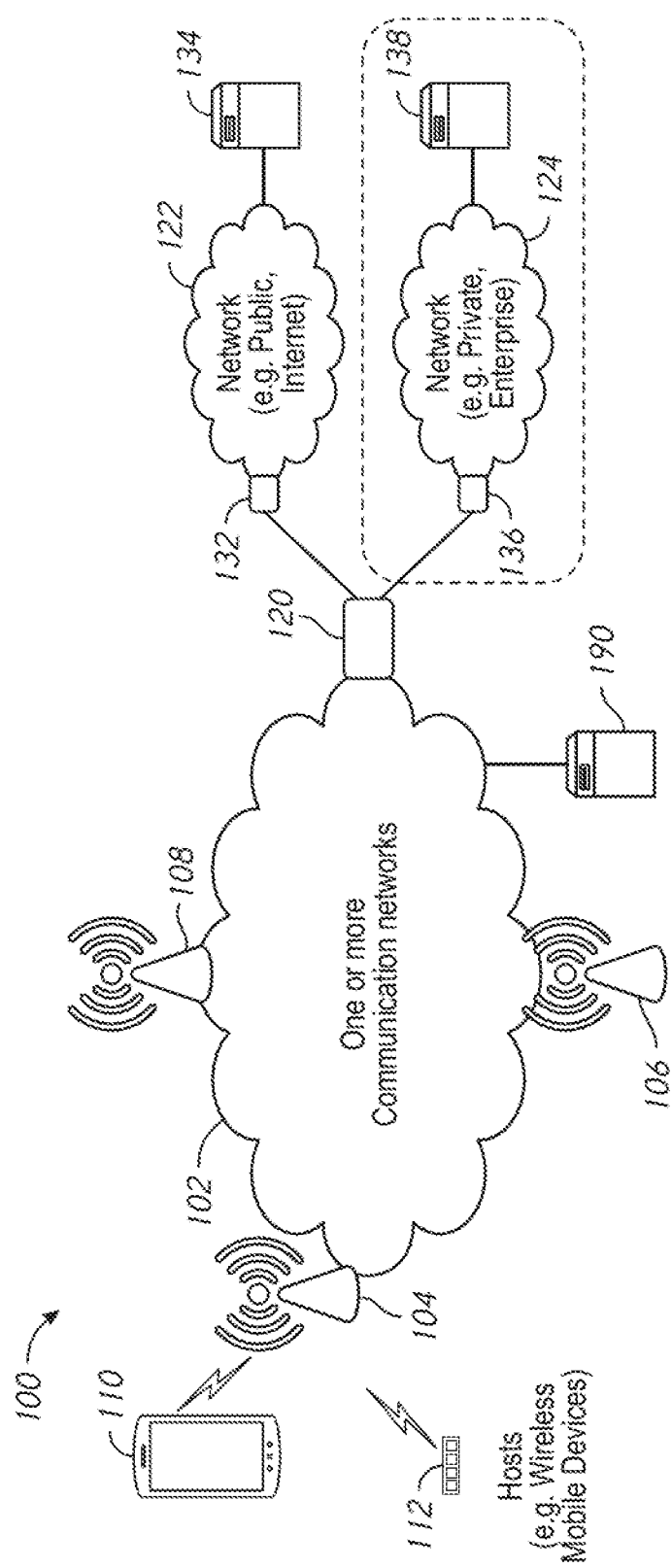
FIG. 1A is an illustrative representation of a communication system which includes communication network within which at least some implementations of the present disclosure may be implemented, where a network node configured for packet flow verification may allow or disallow packet flow to a succeeding network node of an additional communication network (e.g. a private enterprise network)

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Methods and apparatus for packet flow verification of non-steered traffic flows having unspecified paths based on traversed network node or service function identities are described herein. The packet flow verification methods and apparatus of the present disclosure may make use of in-situ Operations, Administration, and Maintenance (iOAM) data which includes the one or more traversed network node or service function identities as network node-added data.

In one illustrative example, a network node configured for packet flow verification may receive a packet from a host and obtain, from a header of the packet, data indicative of one or more traversed network node or service function identities. The identities may correspond to one or more traversed network nodes or service functions through which the packet has traversed in a (non-steered) communication having an unspecified path. Each received data indicative of a traversed network node or service function identity may be network node-added data, provided as part of iOAM data. The network node may allow or disallow a forwarding of the packet from the network node to a succeeding network node, based on identifying whether a correspondence exists between the received data indicative of the one or more traversed network node or service function identities and selectively-retrieved data indicative of one or more required network node or service function identities associated with a type or identity of the host or host application. The one or more required network node or service function identities may correspond to one or more required security functions to be applied to the packet; the security functions such as a firewall service function, an anti-virus or malware protection function, an intrusion protection function, a distributed denial of service (DDoS) mitigation function, and/or an encrypted tunnel analytics function.

Thus, in at least some implementations of the present disclosure, packet flow verification may be provided in various useful applications for many "ordinary" IP traffic flows (or other type flows) having unspecified paths. Implementations of the present disclosure need not require a preordained path or controller and/or the overhead of traffic steering.

More detailed and alternative techniques and implementations are provided herein as will be described below.

EXAMPLE EMBODIMENTS

FIG. 1A is an illustrative representation of a communication system 100 which includes communication network 102 within which at least some implementations of the present disclosure may be provided. A plurality of hosts, such as hosts 110 and 112, may connect with and access the communication network 102 for communications. For example, hosts 110 and 112 may be connected in the communication network 102 to communicate with one or more servers 190.

In some implementations, the communication network 102 may be or include a wireless network, such as a wireless local area network (WLAN) or "Wi-Fi" network which includes one or more wireless access points (APs) 104, 106, and 108. The WLAN/wireless APS 104, 106, and 108 may be operative in accordance with IEEE 802.11 or the like. Here, hosts 110 and 112 may be wireless mobile devices which access the communication network 102 via wireless APs 104, 106, and 108. The wireless mobile devices may be smart phones, cell phones, wireless computing devices, laptop computers, tablet computers, and Internet of Things (IoT) devices, to name a few. As is apparent, there may be a variety of different types of hosts and/or host applications used in communication network 102. In FIG. 1A, server 190 of communication network 102 may be a web server, or a server adapted to provide a captive portal and/or log-in access for hosts. In the example of FIG. 1A, hosts 110 and 112 are shown accessing the communication network 102 via wireless AP 104.

Packet flows from different hosts or host applications may be processed by different service functions in the network. Many of these "ordinary" IP traffic flows (or other type flows) may be non-steered traffic flows having unspecified paths (e.g. no specified or predetermined segment route or "SR" paths).

Consider the difference between a trusted, "known," and/or authenticated host (e.g. a wireless mobile device of an enterprise or corporate user) and an untrusted, "unknown," and/or unauthenticated host (e.g. a wireless mobile device of a guest user), in a WLAN that advertises and uses the same service set identifier (SSID) for such hosts. As another example, consider the difference between a traditional smart phone and an IoT device. IoT is an extension of the traditional Internet, allowing a very large number of smart devices, such as home appliances, network cameras, sensors and controllers, to connect to one another to share information and improve user experiences. Many IoT devices are simply micro-computers used for domain-specific computations rather than typical, function-specific embedded devices. Hence, many existing attacks, targeted at traditional computers connected to the Internet, may also be directed at IoT devices. For example, distributed denial of service (DDoS) attacks have become very common in IoT environments, as these environments currently lack basic security monitoring and protection mechanisms.

A network node 120 for packet flow verification may be provided in the communication network 102. The network node 120 may be a routing device, such as a router, a switch, a gateway, a server, a trusted host computer that supports the transiting of traffic, or other network device. Network node 120 may be configured to route packet flows from hosts 110 and 112 to any one of additional communication networks 122 and 124. In the illustrated example, communication network 122 may be a public network, such as the Internet. Network node 120 may route packet flows from hosts 110 and 112 to a succeeding network node 132 of communication network 122 for accessing a server 134 of network 122. Here, network node 120 may freely allow many or most (e.g. all) packet flows from hosts 110 and 112 in communication network 102 (e.g. the WLAN) to communication network 122 (i.e. the Internet).

On the other hand, communication network 124 may be a private network, such as a private enterprise network. This private network is external to the wireless network. Here, network node 120 may route packet flows from hosts 110 and 112 to a succeeding network node 136 of communication network 124 for accessing a server 138 of network 124. Packet flows to communication network 124 may be restricted to those that are processed by one or more service functions (e.g. security functions). The service functions to be utilized may depend on the type or the identity of host or host application (e.g. host 110 or 112) or its application(s), or even the type of packet flows. Here, network node 120 may be configured for packet flow verification, to allow or disallow packet flows from hosts 110 and 112 to succeeding network node 136 of communication network 124.

Figure 1B:
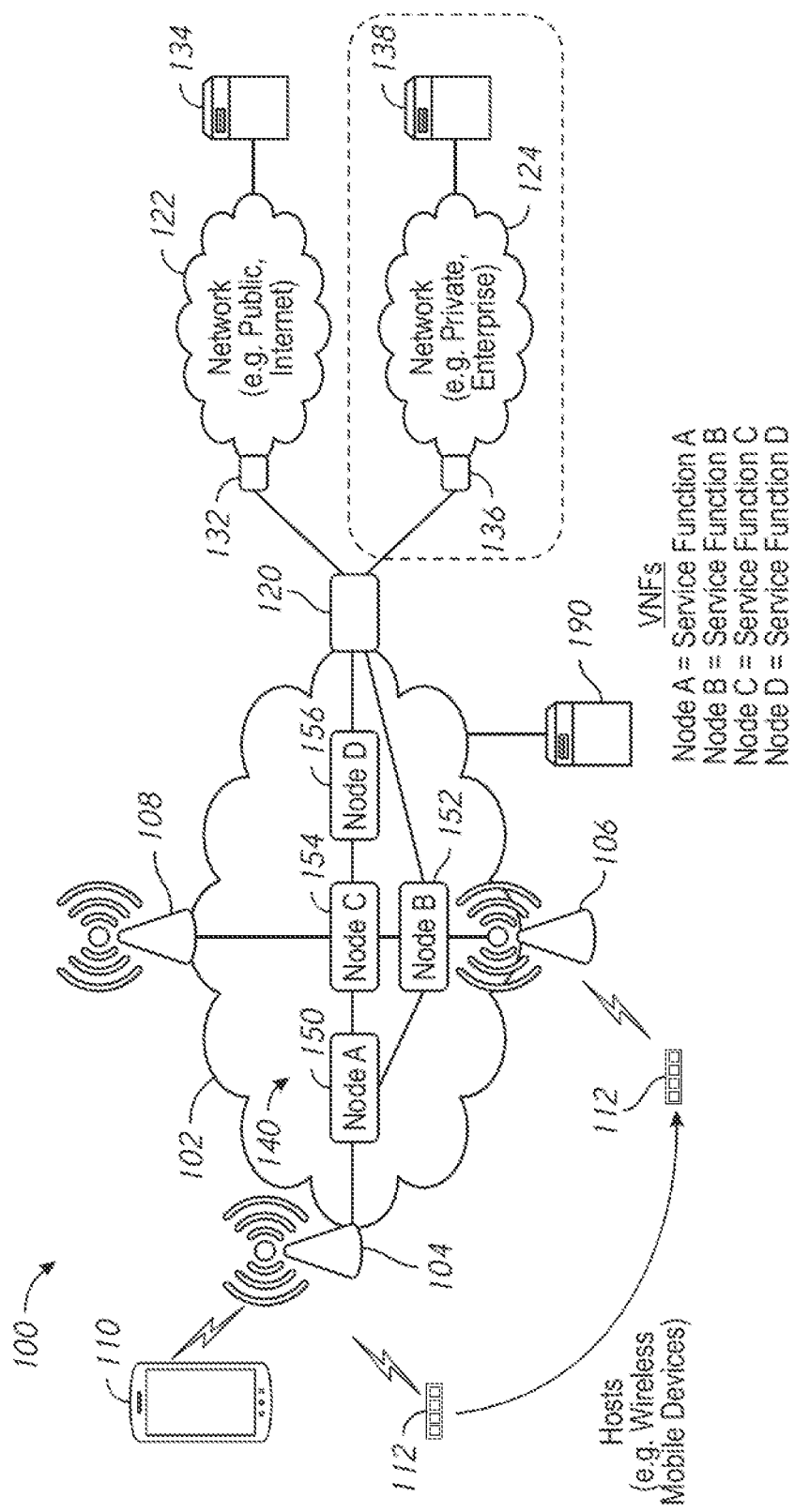
FIG. 1B is an illustrative representation of the communication system of FIG. 1A, further illustrating a plurality of network nodes through which packets may traverse, where each network node includes one or more service functions.

FIG. 1B is an illustrative representation of the communication system 100 of FIG. 1A, further illustrating a plurality of network nodes 140 through which packets may traverse during communications involving hosts 110 and 112. In the illustrated example, network nodes 140 include network nodes 150, 152, 154, and 156 designated as Nodes A, B, C, and D, respectively. Each one of the network nodes 140 may include one or more service functions (e.g. security functions). As illustrated in FIG. 1B, Nodes A, B, C, and B may include Service Functions A, B, C, and D, respectively. The service functions may be or include security functions, such as a firewall service function (e.g. of a specified version number), an anti-virus or malware protection function, an intrusion protection function, a DDoS mitigation function, or an encrypted tunnel analytics function. In some implementations, each service function may be implemented in software as a Virtualized Network Function (VNF) deployed on a Network Functions Virtualization Infrastructure (NFVI).

Figure 1C:
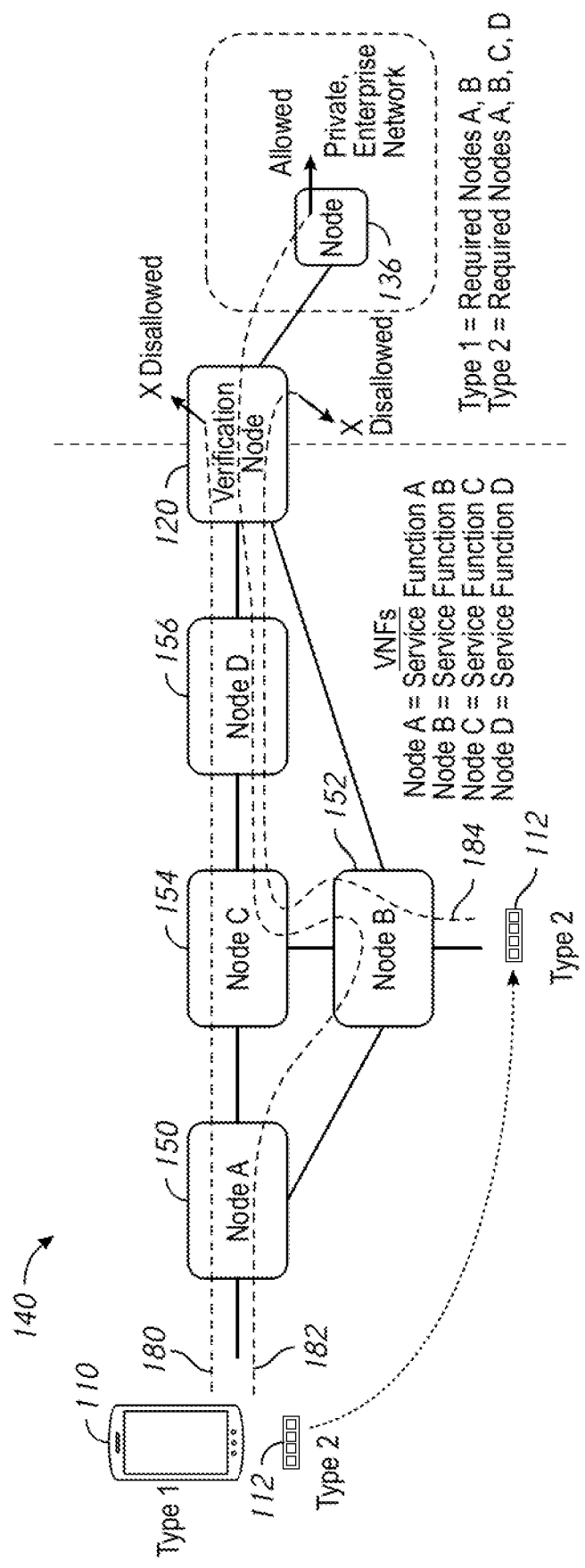
FIG. 1C is an illustrative representation of the plurality of network nodes of FIG. 1B, further illustrating a plurality of "non-steered" packet flow paths through the network nodes, where each packet flow path may be associated with a plurality of service functions.

Note that, in the example of FIG. 1B, hosts 110 and 112 are initially shown accessing the communication network 102 via wireless AP 104; however, a host (e.g. host 112) may be relocated to move to a different wireless AP 106 where the one or more network nodes through which packets may traverse may be different. The same wireless access and relocation is illustrated in FIG. 1C.

It would be desirable to verify packet flows in various settings for "ordinary" IP traffic flows (or other type flows) having unspecified paths, especially where (e.g. high) mobility may be involved. Also, it would be desirable to "do without" the overhead of traffic steering and its requirement for a preordained path or controller.

Figure 2:
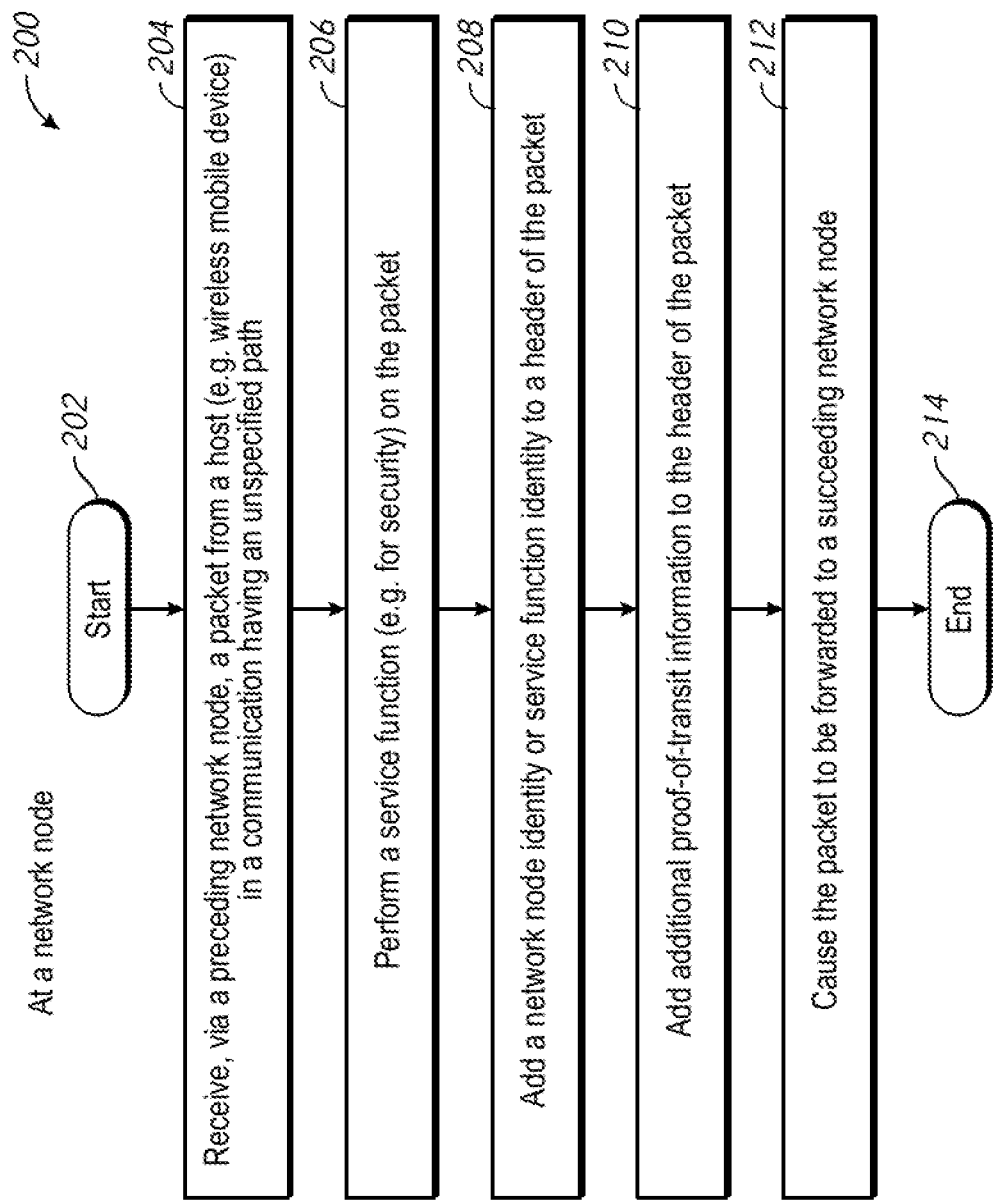
FIG. 2 is a flowchart for describing a method for use in packet flow verification for non-steered traffic flows having unspecified paths according to some implementations of the present disclosure, which may be for use in a network node configured to perform a service function.

FIG. 2 is a flowchart for describing a method for use in packet flow verification for a communication having an unspecified path according to some implementations of the present disclosure, which may be for use in a network node configured to perform a service function. The method of FIG. 2 may be performed at a network node configured to perform a service function, such as a security function, on a packet flow associated with a host. The network node may be a network device, a router, a tunnel router, a server, or other network infrastructure equipment. The network node may be any one of the network nodes 150, 152, 154, or 156 of FIGS. 1A-1C (or e.g. each one of these nodes 150, 152, 154, or 156 or a subset thereof). The network node may include one or more processors and one or more memories coupled to the one or more processors. The method may be embodied as a computer program product including a non-transitory computer readable medium and instructions stored in the computer readable medium, where the instructions are executable on one or more processors of the network node for performing the steps of the method.

Beginning at a start block 202 of FIG. 2, the network node may receive, via a preceding network node, a packet from a host (e.g. a wireless mobile device) (step 204 of FIG. 2). The packet may be part of a non-steered communication having an unspecified path (e.g. no specified or predetermined segment route or "SR" path). The network node may perform a service function on the packet (step 206 of FIG. 2). The service function may be, for example, a security function such as a firewall service function, an anti-virus or malware protection function, an intrusion protection function, a DDoS mitigation function, and/or an encrypted tunnel analytics function. The network node may add a network node identity or a service function identity to a header of the packet (step 208 of FIG. 2). In step 208, the service function identity may be an identity for identifying the service function performed in step 206; on the other hand, the network node identity may be an identity for identifying the network node in step 206, which may be implicitly or explicitly associated with a service function.

In some implementations, the network node may add additional proof-of-transit data to the header of the packet (step 210 of FIG. 2). The additional proof-of-transit data may be or include one or more of a digital signature (e.g. based on the associated network node identity or other such data), a traversal timestamp, a version number of application or node, node location or geolocation, node queue size, or node congestion information, etc. Here, the digital signature may be generated at least in part from a hardware security module (HSM) of a traversed network node.

The network node may then cause the modified packet to be forwarded to a succeeding network node (step 212 of FIG. 2). The succeeding network node may be the network node 120 of FIGS. 1A-1C (or any suitable preceding network node therein). As is apparent, the header of the modified packet includes network node-added data and, more particularly, such network node-added data may be iOAM data.

Figure 3A:
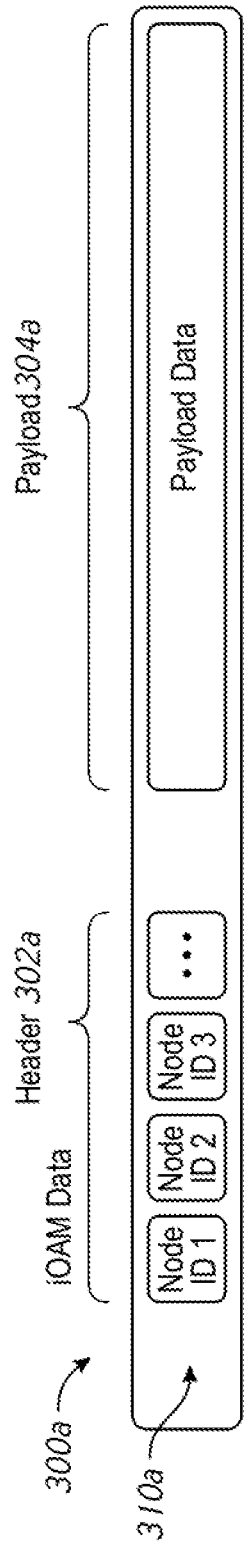
FIGS. 3A-3C are illustrative representations of general message formats of packets for use in packet flow verification for non-steered traffic flows having unspecified paths according to some implementations of the present disclosure, wherein headers of the packets include network node-added data and/or in-situ Operations, Administration, and Maintenance (iOAM) data.
Figure 3B:
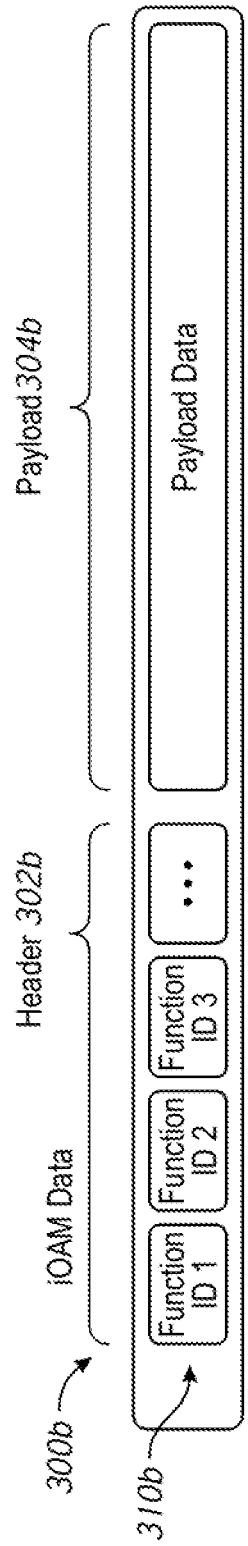
Figure 3C:
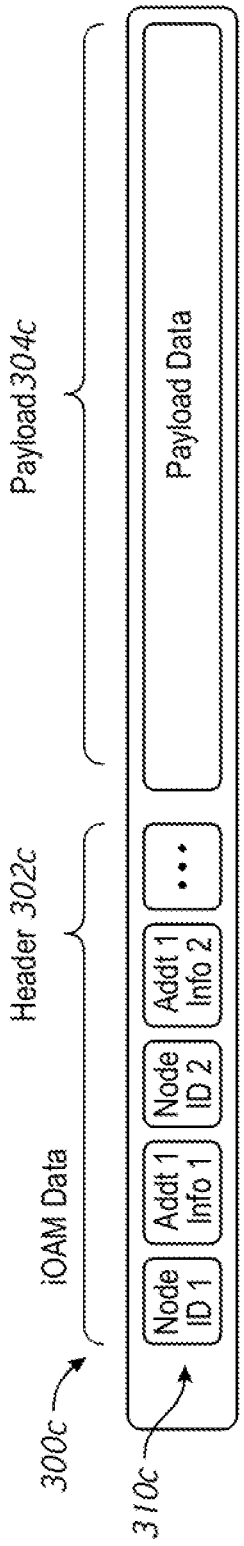

FIGS. 3A-3C are illustrative representations of general message formats 300A, 300B, and 300C of packets for use in packet flow verification in communications involving unspecified paths according to some implementations of the present disclosure.

In FIG. 3A, the message format 300A of the packet includes a header 302A and a payload 304A which may include payload data. As shown, the packet may be part of a communication having an unspecified path (e.g. no specified or predetermined segment route or "SR" path). Header 302A may include network node-added data or, more particularly, iOAM data. More specifically in FIG. 3A, header 302A may include data indicative of one or more network node identities 310A (e.g. Node ID 1, Node ID2, Node ID3, etc.). A network node identity may be an identification or name of a particular network node, or an address of the particular network node, such as an IP address. In some implementations, the identification may be a signed security device identity (SUDI) certificate or a hash of the SUDI. Each one of the network node identities 310A in header 302A may be (implicitly or explicitly) associated with a (e.g. unique) service function which is performed at the network node. Each service function may be implemented in software as a VNF.

In FIG. 3B, the message format 300B of the packet includes a header 302B and a payload 304B which may include payload data. Again, the packet may be part of a communication having an unspecified path (e.g. no specified or predetermined SR path). Header 302B may include network node-added data or, more particularly, iOAM data. More specifically in FIG. 3B, header 302B may include data indicative of one or more service function identities 310B (e.g. Function ID 1, Function ID2, Function ID3, etc.). A service function identity may be an identification or name of a particular service function. The service function may be executable at the network node and implemented in software as a VNF. The service function may be, for example, a security function.

In FIG. 3C, the message format 300C of the packet includes a header 302C and a payload 304C which may include payload data, and is generally the same as or similar to that shown in FIG. 3A. However, header 302C of FIG. 3C is shown to include additional proof-of-transit data ("Addt'l Info") associated with each network node identity (or e.g. service function identity). Additional proof-of-transit data may include an indication of an outcome or result (e.g. pass or fail) of service function processing at the traversed network node (e.g. verify that the host's anti-virus software has a predetermined or "latest" patch). Additional proof-of-transit data may be or include one or more of a digital signature (e.g. based on the associated network node identity or other such data), a traversal timestamp, a version number of application or node, node location or geolocation, node queue size, or node congestion information, etc. Note that the digital signature may be generated at least in part from an HSM of a traversed network node. Upon receipt of any such data, the network node for packet flow verification may obtain comparable required parameters stored in memory and perform a comparison process or other such assessment for packet flow verification.

Figure 4:
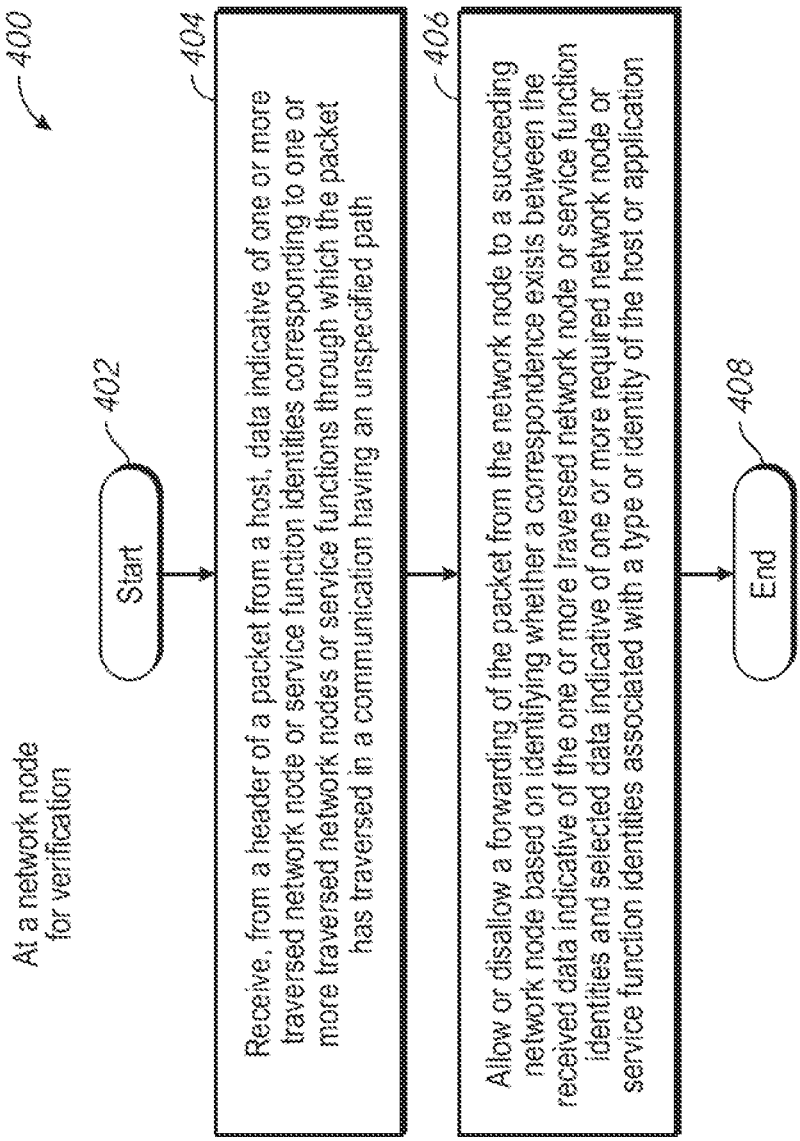
FIG. 4 is a flowchart for describing a method for use in packet flow verification for non-steered traffic flows having unspecified paths according to some implementations of the present disclosure, which may be for use in a network node configured for packet flow verification.

FIG. 4 is a flowchart 400 for describing a method for use in packet flow verification in communications having unspecified paths according to some implementations of the present disclosure, which may be for use in a network node configured for packet flow verification. The method of FIG. 4 may be performed at a network node configured for packet flow verification. The network node may be the network node 120 of FIGS. 1A-1C. The network node may be a network device, a router, a tunnel router, a server, or other network infrastructure equipment. The network node may include one or more processors, one or more memories coupled to the one or more processors, and one or more network/communication interfaces for communicating data. The method may be embodied as a computer program product including a non-transitory computer readable medium and instructions stored in the computer readable medium, where the instructions are executable on one or more processors of the network node for performing the steps of the method.

To begin, the network node may receive a packet from a host (e.g. a wireless mobile device) via a communication network. For verification purposes, at a start block 402 of FIG. 4, the network node may receive or obtain, from a header of the packet, data indicative of one or more traversed network node or service function identities (step 404 of FIG. 4). The identities may correspond to one or more traversed network nodes or service functions through which the packet has traversed in a (non-steered) communication having an unspecified path (e.g. no predetermined or specified SR path). Each received data indicative of a traversed network node or service function identity may be network node-added data, i.e. data that are added to the header of the packet at the network node through which the packet has traversed. In particular, the received data may be in-situ Operations, Administration, and Maintenance (OAM) data. In some implementations, the data may be derived from secure device identity hardware, such as an HSM associated with the network node.

The network node may allow or disallow a forwarding of the packet from the network node to a succeeding network node, based on identifying whether a correspondence exists between the received data indicative of the one or more traversed network node or service function identities and selectively-retrieved data indicative of one or more required network node or service function identities associated with a type or identity of the host or host application (step 406 of FIG. 4). The succeeding network node may be the network node 136 of communication network 124 of FIGS. 1A-1C.

In some implementations, the one or more required network node or service function identities for the given type or identity of the host or host application may correspond to one or more required security functions. The one or more required security functions may include one or more of a firewall service function, an anti-virus or malware protection function, an intrusion protection function, a DDoS mitigation function, and/or an encrypted tunnel analytics function, as a few examples.

As an example of step 406, a correspondence between the received data and the selectively-retrieved data may exist when most or all of the selected, required network node or service function identities are identified or detected in the packet header as traversed network node or service function identities (e.g. a match therebetween). As another example of step 406, a correspondence between the received data and the selectively-retrieved data may exist when most or all of the selected, required network node or service function identities are identified or detected in the packet header as "comparable" traversed network node or service function identities (e.g. a match therebetween).

In some implementations, the header may further include additional proof-of-transit data for verification. Additional proof-of-transit data may be or include one or more of a digital signature (e.g. based on the associated network node identity, hardware security module or "HSM" data, or other such data), a traversal timestamp, a version number of application or node, node location or geolocation, node queue size, or node congestion information, etc. Upon receipt of such data, the network node for packet flow verification may obtain comparable required parameters stored in memory and perform a comparison process or other such assessment for packet flow verification. For example, a packet having a traversal timestamp that is not within a specified (current) timestamp range is disallowed from being forwarded. As another example, a packet having a digital signature that fails verification is disallowed from being forwarded. As even another example, a packet having a version number that fails to match a specified version number is disallowed from being forwarded.

Figure 5A:
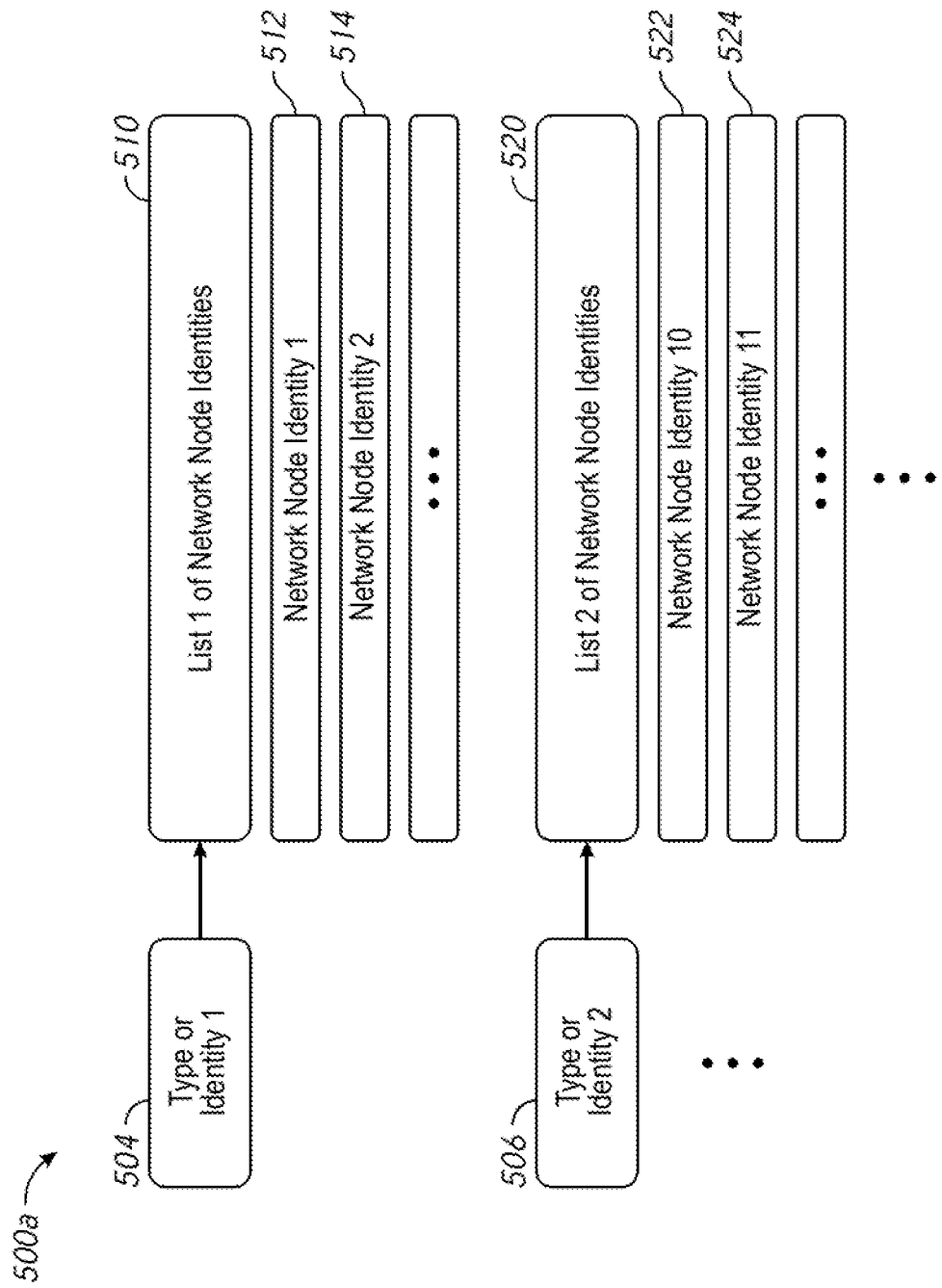
FIGS. 5A-5C are illustrative representations of data which are stored in memory, including stored associations between each one of a plurality of types or identities of hosts or host applications and one or more required network node or service function identities associated with the type or the identity of the host or host application.
Figure 5B:
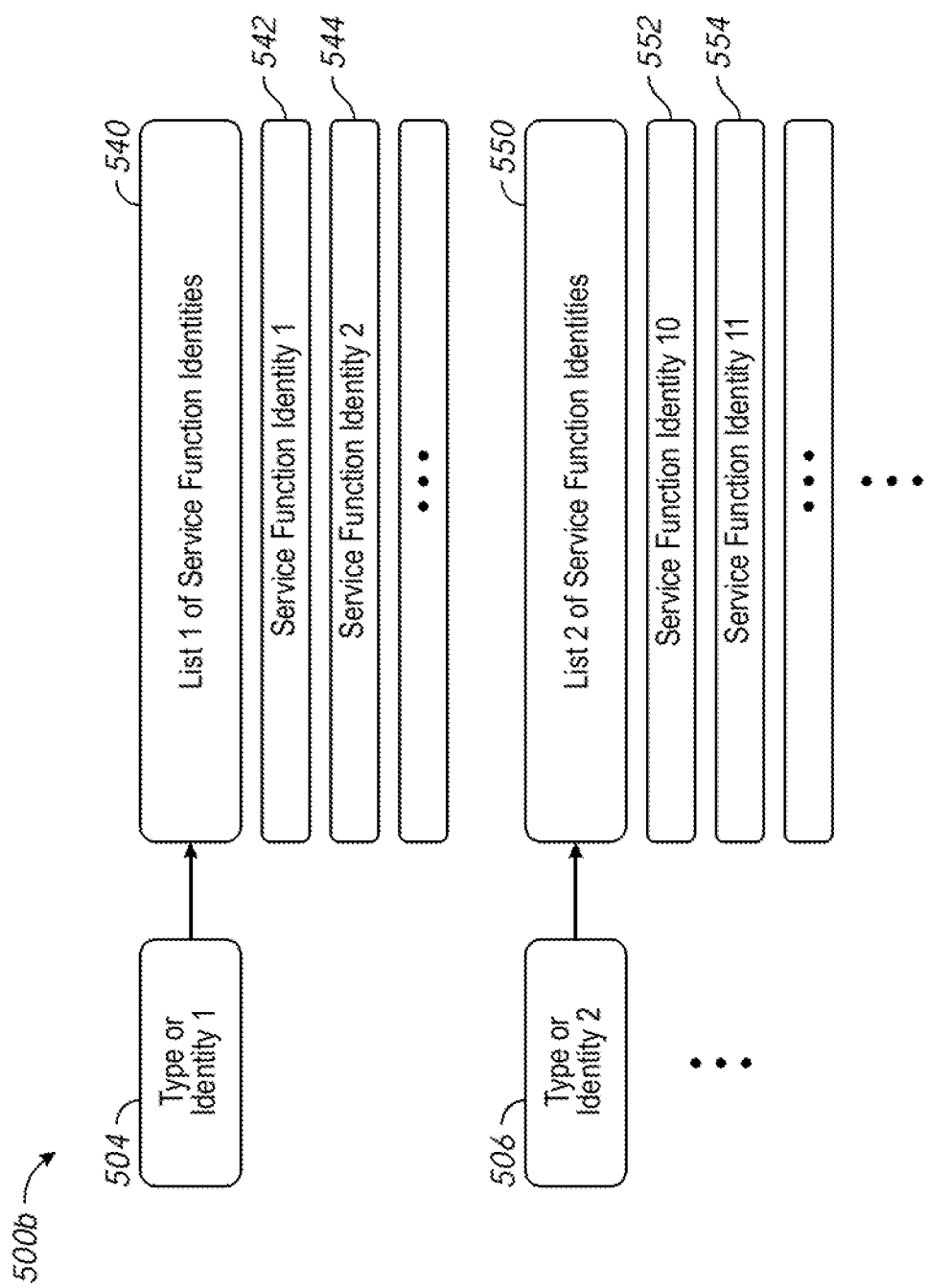
Figure 5C:
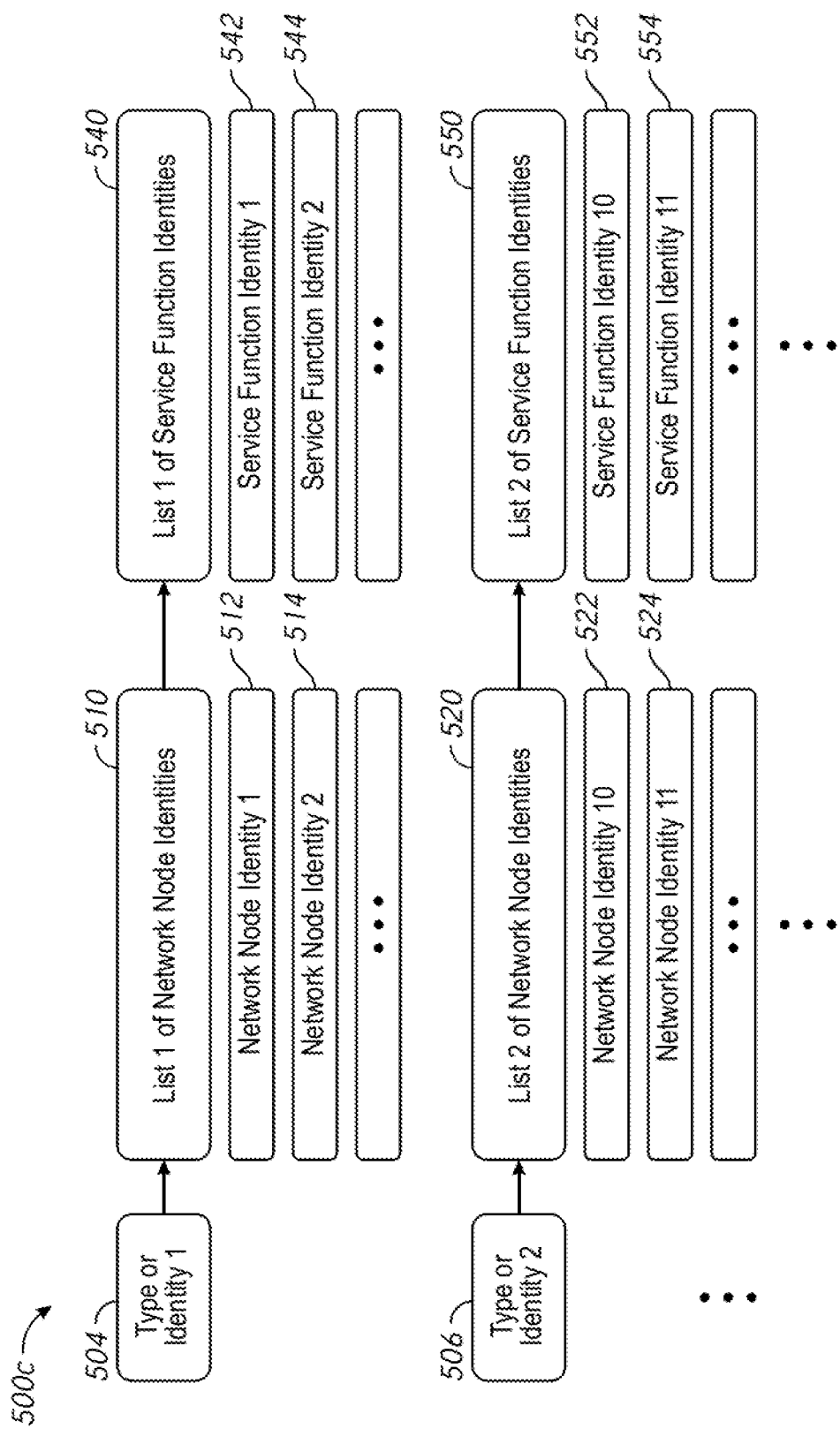

FIGS. 5A-5C are illustrative representations of data stored in memory which may be for use in at least some implementations of the present disclosure.

In FIG. 5A, the illustrative representation of stored data 500A including a plurality of types or identities of hosts or host applications is shown, each of which may be stored in association with one or more required network node identities. As illustrated in the example, data 504 indicative of a type or identity 1 is stored in association with a list 1 of network node identities 510, which may include data 512 indicative of a network node identity 1 and data 514 indicative of a network node identity 2, etc. In addition, data 506 indicative of a type or identity 2 is stored in association with a list 2 of required network node identities 520, which may include data 522 indicative of a required network node identity 10 and data 524 indicative of a required network node identity 11, etc.

The hosts (e.g. wireless mobile devices) may be of any suitable type, such as a traditional smartphone or IoT device (e.g. a medical IoT device). The type of host may be a trusted, "known," and/or authenticated host ("enterprise," "corporate" user), versus an untrusted, "unknown," and/or unauthenticated host ("guest" user). The type of host may relate to a subscription or tier associated with the host or user, for example, a "standard" level or tier versus a "premium" level or tier. The identity of the host may any suitable identity, such as a subscriber identity, a mobile identity, an individual identity, a group identity, etc.

A network node identity may be any suitable identification or name of a particular network node, including an address (e.g. an IP address), a signed security device identity (SUDI) certificate, a hash of the SUDI, and even including timestamp information (as an indication of "freshness"). Note that each one of the required network node identities may be (implicitly or explicitly) associated with a (e.g. unique) service function that is performed at the network node. In some implementations, each service function may be implemented in software as a VNF. The one or more service functions may correspond to one or more required security functions, such as one or more of a firewall service function, an anti-virus or malware protection function, an intrusion protection function, a DDoS mitigation function, and/or an encrypted tunnel analytics function, as a few examples.

In FIG. 5B, the illustrative representation of stored data 500B including a plurality of types or identities of hosts or host applications is shown, each of which is stored in association with one or more required service function identities. As illustrated in the example, data 504 indicative of the type or identity 1 is stored in association with a list 1 of service function identities 540, which may include data 542 indicative of a service function identity 1 and data 544 indicative of a service function identity 2, etc. In addition, data 506 indicative of the type or identity 2 is stored in association with a list 2 of service function identities 550, which may include data 552 indicative of a service function identity 10 and data 554 indicative of a service function identity 11, etc. Note that each one of the service function identities may be (implicitly or explicitly) associated with a (e.g. unique) service function that is performed at the network node. In some implementations, each service function may be implemented in software as a VNF. The one or more service functions may correspond to one or more required security functions, such as one or more of a firewall service function, an anti-virus or malware protection function, an intrusion protection function, a DDoS mitigation function, and/or an encrypted tunnel analytics function, as a few examples.

In FIG. 5C, the illustrative representation of stored data 500C is the same as that of FIG. 5A, except as follows. The stored data 512 indicative of the network node identity 1 is further (explicitly) stored in association with data 542 indicative of service function identity 1, and data 514 indicative of network node identity 2 is further (explicitly) stored in association with data 544 indicative of service function identity 2. Also, the stored data 522 indicative of the network node identity 10 is further (explicitly) stored in association with data 552 indicative of service function identity 10, and data 524 indicative of network node identity 11 is further (explicitly) stored in association with data 554 indicative of service function identity 11.

In the illustrative examples of FIGS. 5A, 5B, and 5C, the stored associations may be determined in advance (i.e. predetermined) and "pushed" to or provisioned to the network node configured for packet flow verification. Also note that additional proof-of-transit information (e.g. see description in relation to FIGS. 2, 3C, 4, and 6) may be further included with such stored associations.

FIG. 6 is a flowchart 600 for describing a more detailed method (e.g. more detailed than that of FIG. 4) for use in packet flow verification according to some implementations of the present disclosure, which may be for use in a network node configured for packet flow verification. The method of FIG. 6 may be performed at a network node configured for packet flow verification. The network node may be the network node 120 of FIGS. 1A-1C. The network node may be a network device, a router, a tunnel router, a server, or other network infrastructure equipment. The network node may include one or more processors, one or more memories coupled to the one or more processors, and one or more network/communication interfaces for communicating data. The method may be embodied as a computer program product including a non-transitory computer readable medium and instructions stored in the computer readable medium, where the instructions are executable on one or more processors of the network node for performing the steps of the method.

At a start block 602 of FIG. 6, the network node may maintain access to memory which is for storing, for each one of a plurality of types or identities of hosts or host applications, an association between a type or identity of a host and one or more required network node or service function identities (step 604 of FIG. 6). Some during operation, the network node may receive a packet from a host via a communication network. The packet is part of a non-steered communication having an unspecified path (e.g. no specified or predetermined SR path). For verification purposes, the network node may receive or obtain, from a header of the packet, data indicative of one or more traversed network node or service function identities (step 606 of FIG. 6). The identities correspond to one or more traversed network nodes or service functions through which the packet has traversed in the communication having the unspecified path. Each received data indicative of a traversed network node or service function identity may be network node-added data, i.e. data that are added to the header of the packet at the network node through which the packet has traversed. In particular, the received data may be iOAM data.

The network node may selectively retrieve, from the memory based on a type or identity of the host or host application, data which includes one or more required network node or service function identities associated with the type of the host or host application (step 608 of FIG. 6). The network node may perform a comparison process for identifying whether a correspondence exists between the received data indicative of the one or more traversed network node or service function identities and the selectively-retrieved data indicative of the one or more required network node or service function identities associated with the type or the identity of the host or host application (step 610 FIG. 6).

The network node may allow the forwarding of the packet from the network node to a succeeding network node based on identifying that the correspondence exists between the received data and the selectively-retrieved data (step 612 of FIG. 6). The network node may disallow the packet from being forwarded to the succeeding network node based on identifying that the correspondence fails to exist between the received data and the selectively-retrieved data (step 614 of FIG. 6). The network node may be the network node 120 of FIGS. 1A-1C.

In some implementations, in step 610, the one or more required network node or service function identities for the given type or identity of the host or host application may correspond to one or more required security functions. The one or more required security functions may include one or more of a firewall service function, an anti-virus or malware protection function, an intrusion protection function, a DDoS mitigation function, and/or an encrypted tunnel analytics function, as a few examples.

As an example of steps 610, 612, and 614, a correspondence between the received data and the selectively-retrieved data may exist when most or all of the selected, required network node or service function identities are identified or detected in the packet header as traversed network node or service function identities (e.g. a match therebetween). As another example of steps 610, 612, and 614, a correspondence between the received data and the selectively-retrieved data may exist when most or all of the selected, required network node or service function identities are identified or detected in the packet header as (at least) "comparable" traversed network node or service function identities.

In some implementations, additional proof-of-transit data may be provided in the packet header, and may be or include one or more of a digital signature (e.g. based on the associated network node identity or other such data), a traversal timestamp, a version number of application or node, node location or geolocation, node queue size, or node congestion information, etc. Additional proof-of-transit data may include an indication of an outcome or result (e.g. pass or fail) of service function processing at the traversed network node (e.g. verify that the host's anti-virus software has a predetermined or "latest" patch). Upon receipt of such data, the network node for packet flow verification may obtain comparable required parameters stored in memory and perform a comparison process or other such assessment for packet flow verification. For example, a packet having a traversal timestamp that is not within a specified (current) timestamp range is disallowed from being forwarded. As another example, a packet having a digital signature that fails verification is disallowed from being forwarded. As even another example, a packet having a version number that fails to match a specified version number is disallowed from being forwarded.

Referring back to FIG. 1C to better illustrate the above-described techniques (e.g. FIGS. 2, 4, and 6), a further illustrative representation of the plurality of network nodes 140 of FIG. 1B is shown. Here, what is detailed is an example of a plurality of possible packet flow paths 180, 182, and 184 of packet flows from hosts 110 and 112 through different sets of network nodes 140, as well as example required nodes/functions. Each packet flow may be a non-steered traffic flow having an unspecified path. A different set of service functions may be applied in each packet flow path 180, 182, and 184.

As shown in FIG. 1C, a packet flow from host 110 (a type "1" host or application) may flow along packet flow path 180 through network nodes 150, 154, and 156 (i.e. Nodes A, C, and D) to reach network node 120 for packet flow verification. A packet flow from host 112 (a type "2" host or application) may flow along packet flow path 182 through network nodes 150, 152, 154, and 156 (i.e. Nodes A, B, C, and D) to reach network node 120 for packet flow verification. After relocation of host 112, a packet flow from host 112 (the type "2" host or application) may flow along packet flow path 184 through network nodes 152, 154, and 156 (i.e. B, C, and D) to reach network node 120 for packet flow verification.

As described previously, network node 120 may be configured for packet flow verification for ensuring compliance of the non-steered packet flows (e.g. packet flows 180, 182, and 184) having unspecified paths. For this purpose, network node 120 may maintain access to memory which stores data including a stored association between a type "1" host or application and required network nodes 150 and 152 (i.e. network nodes A and B). The stored data may also include a stored association between type "2" host or application and required network nodes 150, 152, 154, and 156 (i.e. network nodes A, B, C, and D).

Consider the packet flow along packet flow path 180 through traversed network nodes 150, 154, and 156 (i.e. Nodes A, C, and D) from host 110 associated with the type "1" host or application. Here, a correspondence fails to exist between traversed network nodes 150, 154, and 156 (i.e. Nodes A, C, and D) and required network nodes 150 and 152 (i.e. Nodes A and B) associated with the type "1" host or application. In particular, the packet failed to traverse the required network node 152 (i.e. Node B). Therefore, the packet flow through packet flow path 180 is disallowed from being forwarded to succeeding network node 136 associated with the private network.

Consider the packet flow along packet flow path 182 through traversed network nodes 150, 152, 154, and 156 (i.e. Nodes A, B, C, and D) from host 112 associated with the type "2" host or application. Here, a correspondence exists between traversed network nodes 150, 152, 154, and 156 (i.e. Nodes A, B, C, and D) and required network nodes 150, 152, 154, and 156 (i.e. Nodes A, B, C, and D) associated with the type "2" host or application. Therefore, the packet flow through packet flow path 182 is allowed to be forwarded to succeeding network node 136 associated with the private network.

Consider the packet flow along packet flow path 184 through traversed network nodes 152, 154, and 156 (i.e. Nodes B. C. and D) from host 112 associated with the type "2 host or application. Here, a correspondence fails to exist between traversed network nodes 152, 154, and 156 (i.e. Nodes B, C, and D) and required network nodes 150, 152, 154, and 156 (i.e. Nodes A, B, C, and D) associated with the type "2" host or application. In particular, the packet failed to traverse the required network node 150 (i.e. Node A). Therefore, the packet flow through packet flow path 184 is disallowed from being forwarded to succeeding network node 136 associated with the private network.

Thus, methods and apparatus for verification of non-steered traffic flows having unspecified paths based on traversed network node or service function identities have been described. As described above, the packet flow verification methods and apparatus of the present disclosure may make use of iOAM data which includes the one or more traversed network node or service function identities as network node-added data.

Advantageously, packet flow verification may be provided in various useful applications for many "ordinary" IP traffic flows (or other type flows) having unspecified paths. Implementations of the present disclosure need not require a preordained path or controller and/or the overhead of traffic steering.

In an illustrative example, a network node configured for packet flow verification may receive a packet from a host and obtain, from a header of the packet, data indicative of one or more traversed network node or service function identities. The identities may correspond to one or more traversed network nodes or service functions through which the packet has traversed in a (non-steered) communication having an unspecified path. Each received data indicative of a traversed network node or service function identity may be network node-added data, provided as part of iOAM data. The network node may allow or disallow a forwarding of the packet from the network node to a succeeding network node, based on identifying whether a correspondence exists between the received data indicative of the one or more traversed network node or service function identities and selectively-retrieved data indicative of one or more required network node or service function identities associated with a type or identity of the host or host application. The one or more required network node or service function identities may correspond to one or more required security functions to be applied to the packet; the security functions such as a firewall service function, an anti-virus or malware protection function, an intrusion protection function, a DDoS mitigation function, and/or an encrypted tunnel analytics function.

In another illustrative example, a network node includes one or more processors and a memory for storing, for each one of a plurality of types of hosts or host applications, an association between a type of a host or host application and one or more required network node or service function identities. The network node may receive, from a header of a packet from a host, data indicative of one or more traversed network node or service function identities. The identities may correspond to one or more traversed network nodes or service functions through which the packet has traversed in a (non-steered) communication having an unspecified path. The network node may selectively retrieve, from the memory based on a type of the host or host application, data which includes one or more required network node or service function identities associated with the type of the host or host application. The network node may perform a comparison process for identifying whether a correspondence exists between the received data indicative of the one or more traversed network node or service function identities and the selectively-retrieved data indicative of the one or more required network node or service function identities associated with the type of the host or host application. The network node may allow the forwarding of the packet from the network node to a succeeding network node based on identifying that the correspondence exists between the received data and the selectively-retrieved data. On the other hand, the network node may disallow the packet to pass to the succeeding network node based on identifying that the correspondence fails to exist between the received data and the selectively-retrieved data.

Note that, although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are used to distinguish one element from another. For example, a first traversed network node could be termed a second traversed network node, and similarly, a second traversed network node could be termed a first traversed network node, without changing the meaning of the description, so long as all occurrences of the "first traversed network node" are renamed consistently and all occurrences of the "second traversed network node" are renamed consistently. The first traversed network node and the second traversed network node are both traversed network nodes, but they are not the same traversed network node.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    receiving a packet at a first network node of a first network;
    determining, from a header of the packet, data indicative of one or more traversed network nodes or service functions through which the packet has traversed in the first network in a non-steered communication having an unspecified path, wherein each network node of the one or more traversed network nodes are operative to add the data comprising a network node identity or a service function identity in the header of the packet, wherein the service function identity is indicative of the service functions performed on the packet by the each network node of the one or more traversed network nodes through which the packet has traversed, and wherein the network node identity identifies a unique service function which is performed at the each network node of the one or more traversed network nodes;
    retrieving stored data indicative of one or more required network nodes or required service functions associated with forwarding of the packet to a second node, the second node being located in a second network, wherein the stored data indicative of the one or more required network nodes or the required service functions associated with forwarding of the packet to the second node is selectively retrieved from a data store based on a type of host associated with a host from which the packet is received, wherein the data store stores data indicative of a plurality of type of hosts and a list of the one or more required network nodes or the required service functions associated with each type of host of the plurality of type of hosts;
    comparing the data indicative of the one or more traversed network nodes or the service functions and the stored data indicative of the one or more required network nodes or the required service functions; and
    determining whether to allow the forwarding of the packet from the first network node to the second network node of the second network, based on identifying a correspondence between the data indicative of the one or more traversed network nodes or the service functions and the stored data indicative of the one or more required network nodes or the required service functions from the comparison.

2. The method of claim 1, wherein the required security functions comprises one or more of a firewall service function, an anti-virus or malware protection function, an intrusion protection function, a distributed denial of service (DDoS) mitigation function, and an encrypted tunnel analytics function.

3. The method of claim 1, wherein the data indicative of the one or more traversed network nodes or the service functions comprises in-situ Operations, Administration, and Maintenance (OAM) data.

4. The method of claim 1, further comprising:
    identifying whether the correspondence exists between the received data indicative of the one or more traversed network nodes or the service functions and the stored data indicative of the one or more required network nodes or the required service functions.

5. The method of claim 1, further comprising:
    allowing the forwarding of the packet from the first network node to the second network node based on identifying that the correspondence exists between the received data indicative of the one or more traversed network nodes or the service functions and the stored data indicative of the one or more required network nodes or the required service functions.

6. The method of claim 1, further comprising:
disallowing the packet to pass to the second network node based on identifying that the correspondence fails to exist between the data indicative of the one or more traversed network nodes or the service functions and the stored data indicative of the one or more required network nodes or the required service functions.

7. The method of claim 1, wherein the data indicative of the one or more traversed network nodes comprises one or more network node identities.

8. The method of claim 7, wherein each of the one or more network node identities comprises an IP address corresponding to a traversed network node of the one or more traversed network nodes.

9. The method of claim 1, wherein the one or more traversed network nodes or the service functions comprises one or more service function identities corresponding to the one or more service functions implemented in software as Virtualized Network Functions (VNFs).

10. The method of claim 1, wherein the one or more traversed network nodes comprise nodes of a wireless local area network, and wherein the second network comprises a private communication network.

11. The method of claim 1, wherein the data further comprises additional proof-of-transit data comprising at least one or more digital signature, a traversal timestamp, a version number of application or node, node location or geolocation, node queue size, or node congestion information.

12. The method of claim 1, wherein the data further comprises additional proof-of-transit data comprising a digital signature generated at least in part from a hardware security module (HSM) of a traversed network node.

13. A network node comprising:
one or more processors; and
a memory coupled to the one or more processors, wherein the one or more processors are configured to:
receive a packet at a first network node of a first network;
determine, from a header of the packet received from the host, data indicative of one or more traversed network nodes or service functions through which the packet has traversed in a non-steered communication having an unspecified path, wherein each network node of the one or more traversed network nodes are operative to add the data comprising a network node identity or a service function identity in the header of the packet, wherein the service function identity is indicative of the service functions performed on the packet by the each network node of the one or more traversed network nodes through which the packet has traversed, and wherein the network node identity identifies a unique service function which is performed at the each network node of the one or more traversed network nodes;
retrieve stored data indicative of one or more required network nodes or required service functions associated with forwarding of the packet to a second node the second node being located in a second network, wherein the stored data indicative of the one or more required network nodes or the required service functions associated with forwarding of the packet to the second node is selectively retrieved from a data store based on a type of host associated with a host from which the packet is received, wherein the data store stores data indicative of a plurality of type of hosts and a list of the one or more required network nodes or the required service functions associated with each type of host of the plurality of type of hosts;
compare the data indicative of the one or more traversed network nodes or the service functions and the stored data indicative of the one or more required network nodes or the required service functions; and
determine whether to allow forwarding of the packet from the first network node to the second network node, based on identifying a correspondence between the data indicative of the one or more traversed network nodes or service functions and the stored data indicative of the one or more required network nodes or the required service functions from the comparison.

14. The network node of claim 13, wherein the required service functions comprises one or more of the following: a firewall service function, an anti-virus or malware protection function, an intrusion protection function, a distributed denial of service (DDoS) mitigation function, and an encrypted tunnel analytics function.

15. The network node of claim 12, wherein the data indicative of the one or more traversed network nodes or the service functions comprises in-situ Operations, Administration, and Maintenance (OAM) data.

16. The network node of claim 12, wherein the one or more processors are further configured to:
perform a comparison process for identifying whether the correspondence exists between the data indicative of the one or more traversed network or the service functions and the stored data indicative of the one or more required network nodes or the required service functions.

17. A non-transitory computer-readable medium that stores a set of instructions which when executed perform a method comprising:
receiving a packet from a wireless mobile device operative in a wireless network,
determine, from the received packet, data indicative of one or more traversed network nodes and service functions through which the packet has traversed in a non-steered communication having an unspecified path, wherein each network node of the one or more traversed network nodes are operative to add the data comprising a network node identity or a service function identity in the header of the packet, wherein the service function identity is indicative of the service functions performed on the packet by the each network node of the one or more traversed network nodes through which the packet has traversed, and wherein the network node identity identifies a unique service function which is performed at the network node of the one or more traversed network nodes;
retrieving stored data indicative of one or more required network nodes and required service functions associated with forwarding of the packet to a succeeding network node of a private communication network external to the wireless network, wherein the stored data indicative of the one or more required network nodes or the required service functions associated with forwarding of the packet to the second node is selectively retrieved from a data store based on a type of host associated with a host from which the packet is received, wherein the data store stores data indicative of a plurality of type of hosts and a list of the one or more required network nodes or the required service functions associated with each type of host of the plurality of type of hosts;

comparing the data indicative of the one or more traversed network nodes or the service functions and the stored data indicative of the one or more required network nodes or the required service functions; and determining whether to allow forwarding of the packet from the wireless mobile device to the succeeding network node of the private communication network external to the wireless network, based on identifying a correspondence exists between the data indicative of the one or more traversed network nodes or the service functions and the stored data indicative of the one or more required network nodes or the required service functions based on the comparison.

18. The non-transitory computer-readable medium of claim 17, further comprising:
wherein the wireless network comprises a wireless local area network (WLAN); and
wherein the required service functions corresponds to one or more required security functions.

19. The non-transitory computer-readable medium of claim 17, wherein the data further comprises additional proof-of-transit data comprising at least one or more digital signature, a traversal timestamp, a version number of application or node, node location or geolocation, node queue size, or node congestion information.

20. The non-transitory computer-readable medium of claim 17, wherein the data further comprises additional proof-of-transit data comprising a digital signature generated at least in part from a hardware security module (HSM) of a traversed network node.

* * * * *